(12) United States Patent
Steynberg et al.

(10) Patent No.: US 9,937,476 B2
(45) Date of Patent: Apr. 10, 2018

(54) SLURRY PHASE APPARATUS

(71) Applicant: Sasol Technology (Proprietary) Limited, Johannesburg (ZA)

(72) Inventors: André Peter Steynberg, Randburg (ZA); Evert Phillippus Kleynhans, Halfway House (ZA); Marshall Stephen Lee, Concord, MA (US); Hermanus Gerhardus Nel, Parys (ZA); Jako Louw, Johannesburg (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 896 days.

(21) Appl. No.: 14/472,304

(22) Filed: Aug. 28, 2014

(65) Prior Publication Data

US 2014/0371334 A1 Dec. 18, 2014

Related U.S. Application Data (63) Continuation of application No. 13/993,319, filed as application No. PCT/IB2011/055607 on Dec. 12, 2011, now abandoned.

(Continued)

(30) Foreign Application Priority Data

Dec. 13, 2010 (ZA) ................................ 2010/08969

(51) Int. Cl.
 *B01J 8/22* (2006.01)
 *B01J 8/18* (2006.01)
 *C10G 2/00* (2006.01)

(52) U.S. Cl.
 CPC ............... *B01J 8/18* (2013.01); *B01J 8/1809* (2013.01); *B01J 8/1827* (2013.01); *B01J 8/22* (2013.01);

(Continued)

(58) Field of Classification Search
 USPC .................................................. 518/700, 701
 See application file for complete search history.

(56) References Cited

U.S. PATENT DOCUMENTS 3,644,192 A * 2/1972 Li ............................ C10G 1/04
 208/408
5,407,644 A * 4/1995 Rytter .................. B01D 29/115
 422/140

(Continued)

FOREIGN PATENT DOCUMENTS

EP 2199369 6/2010
WO WO-9416807 A1 * 8/1994 .............. B01J 8/006

(Continued)

OTHER PUBLICATIONS

International Search Report for PCT/IB2011/055607 (dated Mar. 16, 2012).

*Primary Examiner* — Jennifer A Leung
(74) *Attorney, Agent, or Firm* — Klarquist Sparkman, LLP (57) ABSTRACT

A method of operating a slurry phase apparatus includes feeding one or more gaseous reactants into a slurry body of solid particulate material suspended in a suspension liquid contained inside a vessel. The one or more gaseous reactants are fed into the slurry body through a gas distributor having downward facing gas outlets and are fed towards a fluid impermeable partition spanning across the vessel below the gas distributor. The partition divides the vessel into a slurry volume above the partition and a bottom volume below the partition. A differential pressure is maintained over the partition between predefined limits by manipulating or allowing changes in the pressure in the bottom volume by employing a pressure transfer passage establishing flow or (Continued)

pressure communication between the bottom volume and a head space above the slurry body.

4 Claims, 4 Drawing Sheets

Related U.S. Application Data

(60) Provisional application No. 61/422,457, filed on Dec. 13, 2010.

(52) U.S. Cl.
CPC ............ *C10G 2/342* (2013.01); *C10G 2/344* (2013.01); *B01J 2208/00132* (2013.01); *B01J 2208/00141* (2013.01); *B01J 2208/00539* (2013.01); *B01J 2208/00884* (2013.01); *B01J 2208/00902* (2013.01); *B01J 2208/00911* (2013.01); *B01J 2208/00991* (2013.01)

(56) References Cited

U.S. PATENT DOCUMENTS

| 8,057,744 B2 * | 11/2011 | Onishi | B01J 8/007 |
| | | | 422/140 |
| 2016/0310925 A1 * | 10/2016 | Steynberg | B01J 8/1827 |

FOREIGN PATENT DOCUMENTS

| WO | WO2007/086610 | 8/2007 |
| WO | WO2007/086612 | 8/2007 |

* cited by examiner

SLURRY PHASE APPARATUS

CROSS REFERENCE TO RELATED APPLICATIONS

This is a continuation of U.S. patent application Ser. No. 13/993,319, filed Jun. 11, 2013, which is a U.S. National Stage of International Application No. PCT/IB2011/055607, filed Dec. 12, 2011, which was published in English under PCT Article 21(2), which in turn claims the benefit of U.S. Provisional Application No. 61/422,457, filed Dec. 13, 2010, and South African Application No. 2010/08969, filed Dec. 13, 2010. These prior applications are incorporated herein in their entirety.

THIS INVENTION relates to slurry phase apparatus. In particular, the invention relates to a method of operating a slurry phase apparatus and to slurry phase apparatus.

Three-phase reactors or slurry bubble column reactors are often employed in the chemical process industry. Usually, they are used for reactions in which the reactants are gaseous, the products include liquids and a solid catalyst is required. These reactions are often exothermic. In such reactions, a gas is thus injected into a slurry which comprises particulate catalyst solids suspended in a liquid. Typically, a gas distributor or sparger is used to inject gas into the slurry. The slurry is in a state of constant agitation under normal operating conditions.

WO 2005/084790 discloses a gas distributor for a slurry reactor with the gas outlets being as close as possible to the floor of the reactor and being adapted to eject gas across the floor of the reactor to sweep catalyst away and thereby enhance catalyst distribution in the reactor. WO 2005/084790 points out that the volume underneath the gas distributor is uncontrolled by cooling means and that the sweeping of catalyst from the floor advantageously circulates catalyst only in the zone directly above the gas distributor where cooling coils predominate. It is evident from e.g. FIG. 1 of WO 2005/08470 that the gas outlets track the curvature of the reactor bottom head.

WO 2005/094979 discloses a gas distributor with downward opening gas nozzles to produce downward jets into slurry during operation. These jets flush a bottom surface of the reactor clean to prevent catalyst from settling on the bottom surface. WO 2005/094979 teaches a certain distribution density of nozzles and also an optimal distance between nozzles and the reactor bottom surface to ensure catalyst suspension on the one hand, and to prevent erosion on the other hand. FIG. 2 of WO 2005/094979 shows how the bottom surface of the reactor is curved and how gas distributor rings are placed to ensure constant spacing between the rings and the bottom surface of the reactor. This is achieved by using different tube lengths to connect the rings with manifolds. WO 2005/094979 points out that with a flat gas distributor, i.e. a distributor arranged in a horizontal plane, having equal tube lengths, the distance between the nozzles and the bottom surface of the reactor will vary which may result in erosion problems in one part of the reactor while catalyst builds up in another part.

The designs employed in WO 2005/094979 and WO 2005/084790 both result in a substantial uncooled reaction volume since the gas distributor fills the bottom head of the reactor. In addition, the bottom head of the reactor forms part of the reactor pressure envelope and is subjected to impingement by gas jets from the gas distributor outlets.

GB 2410906 also deals with gas distribution in slurry phase apparatus and discloses a slurry phase apparatus with an apertured fluid-permeable support below a sparger. The apertured support retains 90% by mass of particles. A fluid inlet is provided below the apertured support for quenching.

WO 2007/086612 discloses a barrier member disposed forward of the direction of gas ejected downwardly from a gas distributor in a slurry reactor. Examples of barrier members that are disclosed include a screen, a plate with a filter and a solid plate. Some embodiments of the bubble column reactor of WO 2007/086612 has the barrier member between the gas distributor and a liquid outlet, which is located in a bottom of the reactor, the barrier member then being apertured to retain catalyst particles.

It is expected that the designs with apertured partitions as taught in GB 2410906 and WO 2007/086612 will result in at least some catalyst material finding their way to below the apertured partition and possibly settling, or becoming lodged in the apertured partition (bearing in mind that catalyst attrition takes place during slurry reactor operation as a result of constant agitation). Settled or lodged catalyst in this uncooled volume with high reagent concentration or partial pressure in the immediate vicinity of the reagent feed will likely result in operational problems such as localised hot-spots with resulting damage to equipment and catalyst.

The above difficulties are avoided at least to some extent or mitigated when implementing a fluid impermeable partition. As will however be appreciated, a fluid impermeable barrier member or partition may in itself pose problems in construction and maintenance. In this regard, it is to be noted that slurry bubble columns used for Fischer-Tropsch hydrocarbon synthesis may operate at more than 30 bar(g).

The approach of implementing a fluid impermeable partition is adopted in CN 1233454 C and US 2010/0216896. These disclosures teach a fluid impermeable barrier member disposed forward of the direction of gas ejected downwardly from a gas distributor, with gaseous reactants fed via a bottom volume created below the fluid impermeable partition into the gas distributor. In both disclosures, the gaseous reactants are fed into the bottom volume via a main inlet conduit discharging into the bottom volume, with flow communication established between the bottom volume and the gas distributor through a plurality of connection conduits extending through the fluid impermeable partition. CN 1233454 C points out that an advantage of this approach is that slurry sucked back into the bottom volume during reduction or interruption of gas flow only enters the bottom volume and cannot immediately enter the main inlet conduit, whereas US 2010/0216896 describes ancillary systems to remove slurry finding its way into the bottom volume. The approach to implementing a fluid impermeable barrier member as taught in CN 1233454 C and US 2010/0216896 is therefore still subject to slurry ingress below the barrier member. In addition, in the event of a gas distributor blockage, the fluid impermeable barrier member will be subjected to large differential pressures (consider e.g. the maximum synthesis gas supply pressure typically used in a slurry bubble column for hydrocarbon synthesis) and will accordingly need to be mechanically designed with these large differential pressures in mind.

A method of operating a slurry phase apparatus or a slurry phase apparatus that simultaneously minimises uncooled volume taken up by a gas distributor and uncooled volume below the gas distributor, prevents or inhibits catalyst laydown and settling, and also allows for a robust and simple mechanical design, is desirable.

According to one aspect of the invention, there is provided a method of operating a slurry phase apparatus, the method including feeding one or more gaseous reactants into a slurry body of solid particulate material suspended in a suspension liquid contained inside a vessel, with a head space above the slurry body, the one or more gaseous reactants being fed into the slurry body through a gas distributor having downward facing gas outlets and being fed towards a fluid impermeable partition spanning across the vessel below the gas distributor, the partition dividing the vessel into a slurry volume above the partition and a bottom volume below the partition; and maintaining a differential pressure over the partition between predefined limits by manipulating or allowing changes in the pressure in the bottom volume by employing a pressure transfer passage establishing flow or pressure communication between the bottom volume and the head space above the slurry body.

Typically, the solid particulate material is a catalyst and the method includes allowing the one or more gaseous reactants to react as they pass upwardly through the slurry body to form a liquid phase and gaseous components, and withdrawing the gaseous components from the head space above the slurry body; and withdrawing liquid phase from the slurry body from above the partition to maintain the slurry body at a desired level in the slurry volume.

In this specification, the term "gas outlet" is intended to refer to an outlet where gas leaves the gas distributor and enters the slurry body. The gas outlets may thus, e.g., be defined by downwardly facing gas injectors or by diffuser pipes extending downwardly from gas ejectors.

Also, in this specification, "fluid impermeable partition" does not mean that the partition may not have one more conduits passing there through. By "fluid impermeable partition" is meant a partition having a body which is of a fluid impermeable material and construction so that slurry or slurry components from the slurry volume above the partition cannot migrate from the slurry body to the bottom volume; however, if desired, one or more conduits may pass through the partition to transfer matter or pressure from outside the slurry body to the bottom volume.

The partition is typically planar or flat and arranged perpendicular to a longitudinal vertical central axis of the vessel, which is typically in the form of a vertically extending elongate column shell. In other words, the partition is typically arranged horizontally, defining a false floor or bottom for the vessel.

It will be appreciated that as a result of the maintaining or manipulation of the differential pressure over the partition to be within predefined limits, the partition does not have to form part of the slurry apparatus pressure envelope or shell. The design pressures for the partition can be set based on the maximum differential pressure over the partition expected for various modes of operation (e.g. start up, normal operation, pressure fluctuations during operation, a slumped bed and the like), in the upward and downward direction respectively, and taking into account the predefined differential pressure limits. Typically the partition has a design pressure which is less than 600 kPa, more preferably less than 300 kPa, even more preferably less than 200 kPa. As will be appreciated, advantageously this can be significantly less than the design pressures for the vessel shell, which may be upwards of 4000 kPa.

The predefined differential pressure limits will thus fall within the design pressure for the partition, e.g. about 500 kPa or about 200 kPa, or even as low as 50 kPa.

The advantage of lower design pressures for the fluid impermeable partition is especially pronounced as the vessel diameter is increased and it is expected that the invention will find particular application in vessels having a diameter above 5 m, more preferably above 7.5 m, even more preferably above 9 m. This advantage is further enhanced where the partition is planar or flat.

The pressure in the bottom volume may thus be allowed to change automatically in sympathy with pressure changes in the slurry volume or in the head space thereby to maintain the differential pressure over the partition within predefined limits. There will typically be a lag between the response of the pressure in the bottom volume following changes in the pressure in the slurry volume or head space, with the magnitude of the pressure differential developing over the partition resulting from transient pressure changes also dependent on the size of the pressure transfer passage. It will thus be appreciated that the pressure transfer passage is preferably sized taking into account various transient operations (e.g. rapid depressurisation of the slurry phase volume) to ensure that the differential pressure of the partition remains within the predefined pressure limits.

The bottom volume may be filled with a liquid, or a gas, or a liquid/gas mixture, or both liquid and gas, but preferably a gas is employed.

By configuring the pressure transfer passage to establish flow or pressure communication between the bottom volume and the head space above the slurry body, flow of slurry, more particularly solid particulate material or catalyst, into the bottom volume is prevented, but pressure is allowed to be transferred or equalised between the head space and the bottom volume.

The pressure transfer passage or conduit may pass through or around the partition allowing transfer of pressure into and from the bottom volume. The pressure transfer passage may thus be internal or external of the vessel.

The pressure transfer passage may be directly between the bottom volume and the head space of the slurry volume by means of at least one conduit establishing direct flow or pressure communication between the bottom volume and the head space.

Alternatively, the pressure transfer passage may establish flow or pressure communication between the bottom volume and at least one process conduit in flow communication with the head space.

Typically a gaseous product withdrawal line originates in the head space above the slurry body in the slurry phase apparatus. In one embodiment of the invention the pressure transfer passage establishes flow communication with the head space by means of the gaseous product withdrawal line. Once again, it will be appreciated that such an arrangement prevents the flow of slurry, and in particular solids material or catalyst into the bottom volume.

The bottom volume may be equipped with a vent or drain line. Typically, unconverted reagents are recycled to the slurry phase apparatus. A small portion of such recycle may conveniently be used as a continuous vent of the bottom volume.

The slurry phase apparatus may be operated in a process which is selected from the group consisting of coal liquefaction, methanol synthesis, higher alcohol synthesis, hydrogenation processes, and hydrocarbon synthesis from carbon monoxide and hydrogen. It is however expected that the method of the invention will find particular application in operating a slurry bubble column in a hydrocarbon synthesis process in which hydrocarbons are synthesized from carbon monoxide and hydrogen using an iron or cobalt catalyst, i.e. a Fischer-Tropsch process.

According to another aspect of the invention, there is provided slurry phase apparatus which includes
- a slurry vessel to hold a slurry body comprising a liquid and solid particulate material with a head space volume above the slurry body;
- a gas distributor in a lower portion of the vessel which defines downwards facing gas outlets;
- a fluid impermeable partition spanning across the slurry vessel below the gas distributor partitioning the vessel into a slurry volume above the partition and a bottom volume below the partition; and
- a pressure transfer passage or conduit passing through or around the partition allowing transfer of pressure into and from the bottom volume, the pressure transfer passage in use establishing flow or pressure communication between the bottom volume and the head space volume in the slurry vessel above the slurry volume thereby to maintain a differential pressure over the partition between predefined limits by manipulating or allowing changes in the pressure in the bottom volume.

The apparatus may include one or more of the following features:
- a gaseous reactants feed line to the gas distributor;
- a gaseous product withdrawal outlet in an upper portion of the vessel, for communicating with a gaseous product withdrawal line; and
- a liquid phase outlet above the partition but below the gaseous product outlet, for communicating with a liquid phase withdrawal line.

The fluid impermeable partition may be as hereinbefore described. The partition may thus be a solid fluid impermeable member, e.g. a flat plate, typically circular in outline. One or more conduits may pass through the partition.

The pressure transfer passage may be as hereinbefore described.

The slurry vessel may be as hereinbefore described.

The gas distributor may include downwardly extending diffuser pipes defining the gas outlets. Such an arrangement limits the potential for slurry ingress into the gas distributor itself. The gas distributor may be arranged in a horizontal plane. Advantageously, with a planar horizontally arranged partition, the downwardly extending diffuser pipes may be of similar length with the gas outlets being equidistantly spaced from the partition. Typically, the diffuser pipes extend from gas injectors, which may be of any design suitable for injecting a gas into a slurry comprising particulate solids suspended in a liquid.

Typically the apparatus includes at least one cooling device inside the vessel above the partition. Typically, for practical reasons, any cooling device would be spaced above the gas distributor so that the partition advantageously limits the uncooled portion of the slurry volume inside the vessel below any lowermost cooling device provided inside the vessel, i.e. inside the slurry volume, to a volume portion extending between the partition and said lowermost cooling device.

The invention will now be described, by way of example, with reference to the accompanying diagrammatic drawings in which.

Figure 1:
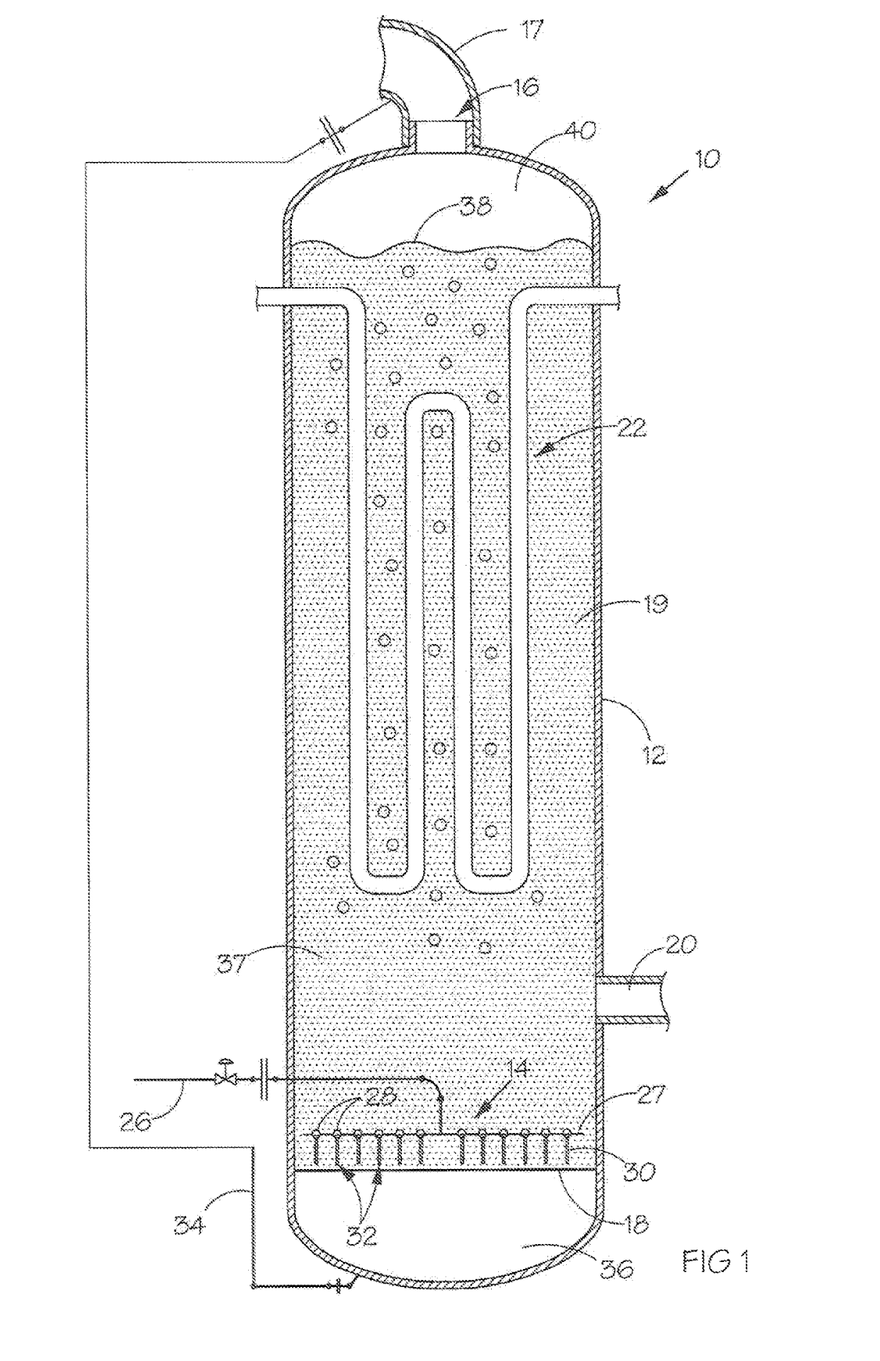
FIG. 1 shows a slurry phase apparatus, in the form of a slurry bubble column, which can be operated in accordance with one embodiment of the invention.

Referring to FIG. 1 of the drawings, reference numeral 10 generally indicates slurry phase or suspension apparatus which can be operated in accordance with one embodiment of the method of the invention. The apparatus 10 includes an upright cylindrical Fischer-Tropsch synthesis slurry phase reactor vessel 12 and a gas distributor 14 located in a bottom portion of the vessel 12. A gaseous components outlet 16 is provided in an upper portion of the vessel 12, with a gaseous products withdrawal line 17 leading from and in flow communication with the gaseous components outlet 16. A solid planar partition or false floor 18 is provided in a bottom portion of the vessel 12. The partition 18 partitions the vessel 12 into a slurry volume 19 above the partition 18, and a bottom volume 36 below the partition 18. A liquid phase outlet 20 is provided below the gaseous components outlet 16 but above the partition 18. A bank 22 of cooling tubes is located above the gas distributor 14 but below the gaseous components outlet 16.

Figure 2:
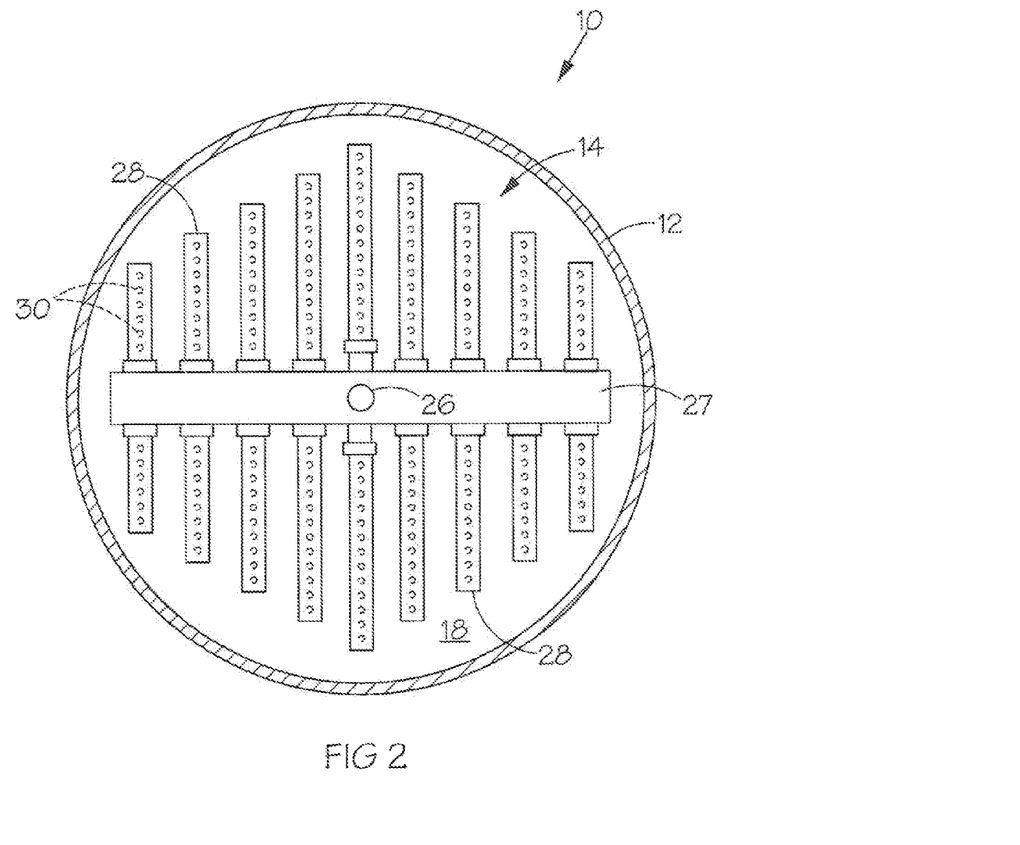
FIG. 2 shows a plan view of a gas distributor of the apparatus of FIG. 1.

The gas distributor 14 is in flow communication with a gaseous reactants feed line 26. The gas distributor 14 may be of any suitable design for feeding a gas into a slurry bed, provided it includes downward facing gas outlets. It may for example be made up of or include radially extending branch pipes connected to concentric rings or tubular toroids, or be made up of or include a system of horizontal distributor pipes branching into smaller horizontal pipes, or be made up of or include a pipe arranged in a spiral in a horizontal plane. In the embodiment illustrated in FIG. 2, the gas distributor 14 includes a header 27 in flow communication with a plurality of lateral pipes 28 and with the feed line 26. A plurality of diffusers 30 extend downwardly from the lateral pipes 28 with each diffuser 30 defining a downwardly facing gas outlet 32 spaced equidistantly from the partition 18. It is however to be appreciated that the particular design of the gas distributor 14 will vary from application to application and that fairly complicated designs may be employed. The various further design possibilities for a gas distributor for a three-phase slurry apparatus however do not fall within the scope of the invention and are not further discussed.

The partition 18 is welded to the vessel 12 using a welding expansion ring in conventional fashion and may include further supports such as I-beams also welded to the vessel 12. The design and manufacture of a vessel 12 with a false floor or partition 18 fall within the knowledge of a person skilled in the art but outside the scope of the present invention and these aspects are not further discussed. Typically, the partition 18 includes at least one manhole (not shown) with a lid to allow access to the bottom volume 36 below the partition 18.

In use, the slurry volume will hold a slurry bed 37. The slurry bed 37 will have an expanded height with an upper surface 38 above the bank 22 of cooling tubes but below the gaseous components outlet 16, leaving a head space 40 to disengage gaseous components from the slurry bed 37.

A pressure transfer passage 34 is provided to manipulate or allow changes in the operating pressure in the bottom volume 36 thereby limiting the pressure differential across the partition 18. The pressure transfer passage 34 extends between the gaseous products withdrawal line 17 and the bottom volume 36, allowing in use the pressure in the bottom volume 36 to be equalised with the pressure in the gaseous products withdrawal line 17, i.e. in essence with the pressure in the head space 40.

The apparatus 10 may include many additional features commonly found in or on slurry bubble columns or similar slurry phase apparatus, such as means for loading and withdrawing catalyst, means for draining spaces, means for filtering catalysts from liquid phase and the like. Such features would typically however be conventional and known to those skilled in the art and need not further be described.

The apparatus 10 can be used, for example, in a Fischer-Tropsch process to synthesise hydrocarbons from carbon monoxide and hydrogen using an appropriate catalyst, such as a supported iron or cobalt catalyst. Synthesis gas, comprising mainly carbon monoxide and hydrogen, thus enters the submerged gas distributor 14 from the gaseous reactant feed line 26 and is injected into the slurry bed 37 through the downward facing gas outlets 32, in order to maintain the slurry bed 37 in a churn turbulent state. The gas is thus injected downwardly through the diffusers 30 and out through the gas outlets 32, towards the partition 18.

The slurry bed 37 comprises the catalyst particles suspended in liquid product, i.e. liquid wax produced in the vessel 12 on the action of the gaseous reactants. The catalyst particles are maintained in suspended state in the slurry bed 37 by means of the turbulence created therein by the gas passing upwardly therethrough.

For Fischer-Tropsch reactions, the vessel 12 is typically maintained at an operating pressure of between about 10 bar and about 40 bar, more typically between about 20 bar and about 30 bar, and at an operating temperature of between 180° C. and 280° C., typically about 220° C. to 260° C. The operating pressure and the operating temperature selected may depend on the nature and spread of gases and liquid product required and the type of catalyst used. Naturally, the apparatus 10 is provided with suitable temperature control means such as the bank 22 of cooling tubes for controlling the reaction temperatures, as well as suitable pressure control means such as one or more pressure control valves.

In the reactor vessel 12, as the synthesis gas passes through the slurry bed 37, the carbon monoxide and hydrogen react to form a range of products in accordance with known Fischer-Tropsch reactions. Some of these products are in gaseous form at the operating conditions of the vessel 12 and are withdrawn, together with unreacted synthesis gas, through the gaseous components outlet 16. Some of the products produced, such as the wax already mentioned, are in liquid form at the operating conditions of the vessel 12 and act as the suspension medium for the catalyst particles. As liquid product is formed, the level 38 of the slurry bed 37 naturally tends to rise and the liquid product is thus withdrawn, by means of the liquid phase outlet 20 to maintain the slurry bed level 38 and to ensure an adequate head space 40. Catalyst particles may be separated from the liquid phase either internally of the vessel 12, using suitable filters (not shown) or externally. Naturally, if separation occurs externally, the catalyst is preferably returned to the slurry bed 37.

As a result of the pressure adjustment or manipulation or balancing through the pressure transfer passage 34, the partition 18 does not have to form part of the pressure envelope of the apparatus 10, as differential pressures over the partition 18 can be kept within predefined limits which are orders of magnitude less than the operating pressure of the vessel 12. The design pressure of the partition 18 is determined by the maximum differential pressure immediately above and below the partition 18 for various modes of operation (e.g. a slumped bed) in the upward and downward direction respectively. So, for example, the partition 18 will still have to be designed to carry the weight of the slurry bed under slumped conditions in the downward direction. Under normal operating conditions however, the differential pressure over the partition 18 can be limited, for example, to less than about 50 to 150 kPa by means of the pressure transfer passage 34.

Figure 3:
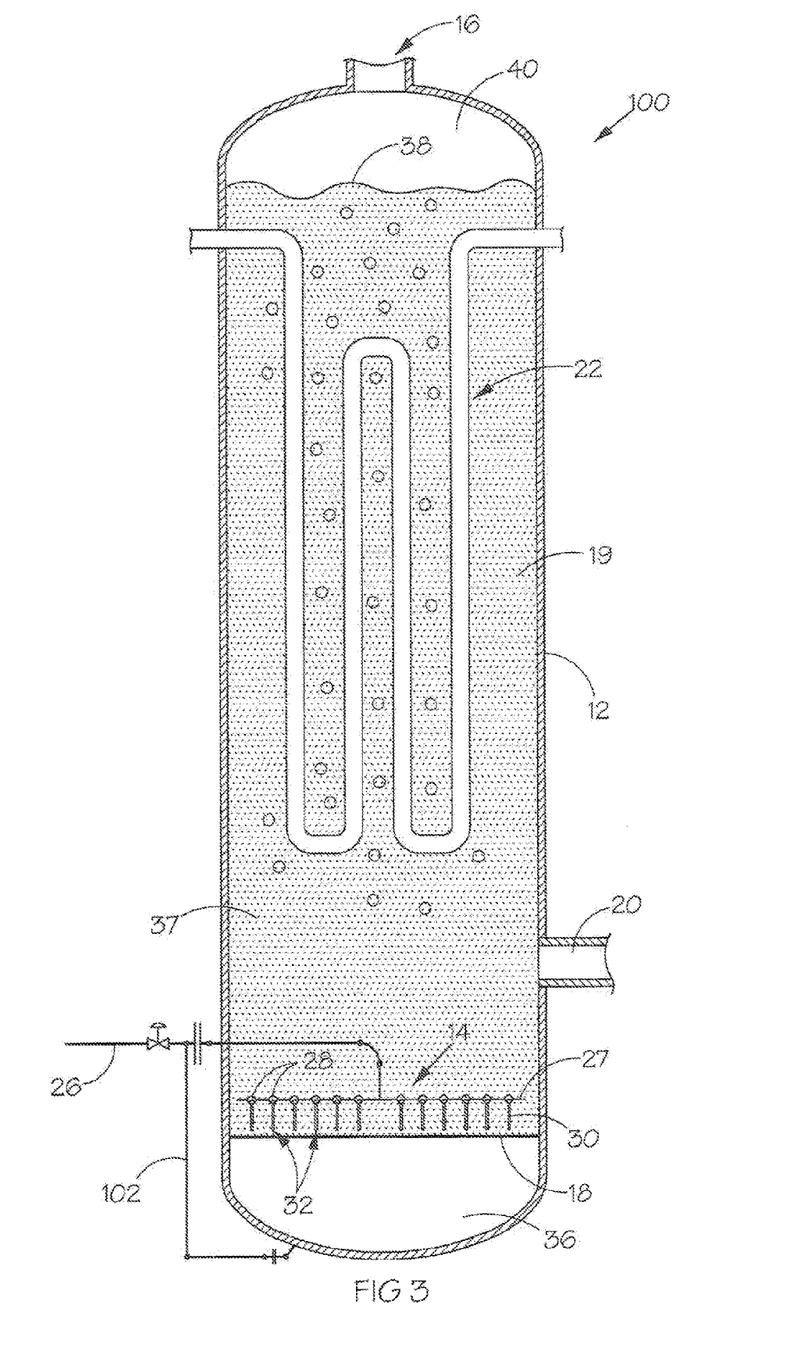
FIG. 3 shows a slurry phase apparatus, in the form of a slurry bubble column, which is not in accordance with the invention.

Referring to FIG. 3 of the drawings, reference numeral 100 generally indicates slurry phase or suspension apparatus which is not in accordance with the invention. The apparatus 100 has features in common with the apparatus 10 and unless otherwise indicated, the same reference numerals are used to indicate the same or similar parts or features.

In the apparatus 100, a balancing flow conduit 102 extends between the feed line 26 and the bottom volume 36. In use, the balancing flow conduit 102 allows the pressure in the bottom volume 36 to be equalised with the pressure in the feed line 26.

Figure 4:
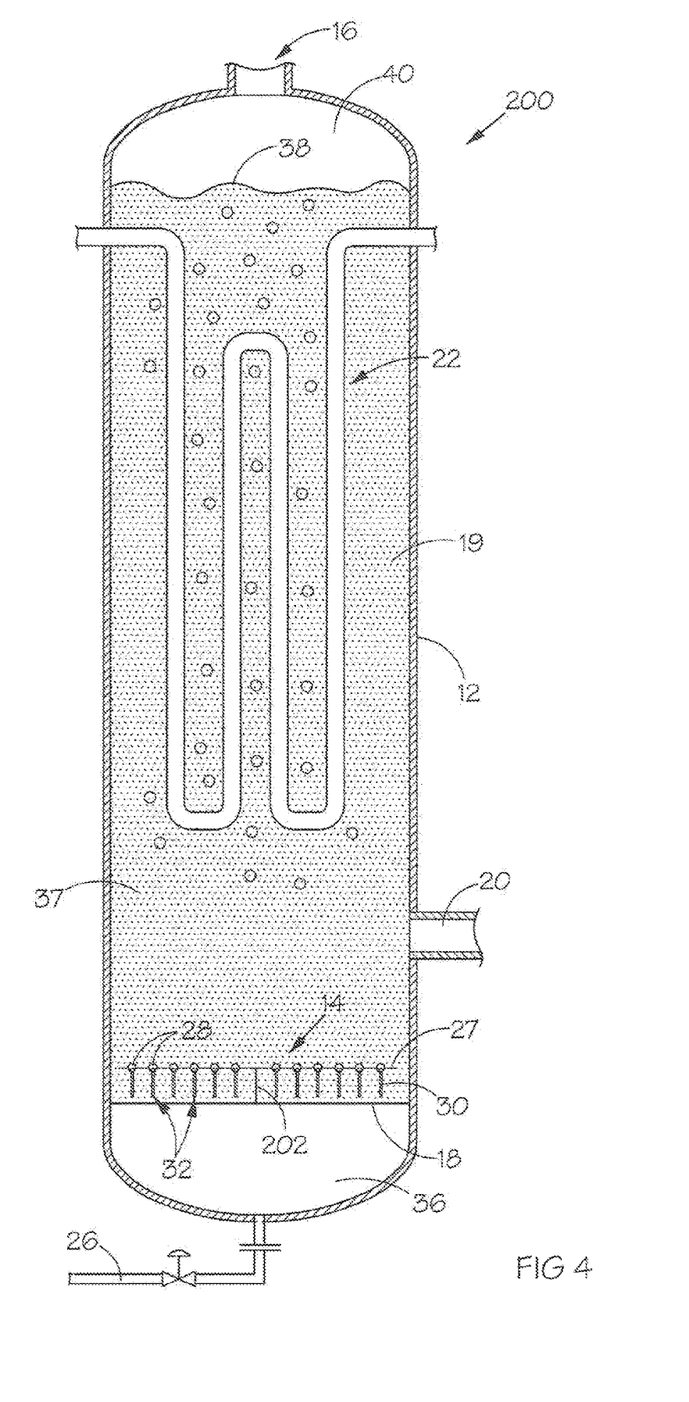
FIG. 4 shows a slurry phase apparatus, in the form of a slurry bubble column, which is also not in accordance with the invention.

Referring to FIG. 4 of the drawings, reference numeral 200 generally indicates slurry phase or suspension apparatus which is also not in accordance with the invention. Again, the apparatus 200 has features in common with the apparatus 10 and unless otherwise indicated, the same reference numerals are used to indicate the same or similar parts or features.

In the apparatus 200, the gaseous reactants feed line 26 leads into the bottom volume 36. The bottom volume 36 is also in direct flow communication with the gas distributor 14 by means of a feed pipe 202 passing through the partition 18. In use, the bottom volume 36 is thus pressurized to the pressure of the gaseous reactants flowing along the gaseous reactants feed line 26.

The apparatus 100 and the apparatus 200 are thus in line with the teachings of CN 1233454 C and US 2010/0216896. However, as pointed out before, these approaches are believed to still suffer from the danger of slurry ingress below the partition 18, since a flow path exists from the slurry body 37 into the bottom volume 36. In addition, in the event of a blockage of the gas distributor 14, the partition 18 will be subjected to large differential pressures (consider e.g. the maximum synthesis gas supply pressure typically used in slurry bubble columns used for hydrocarbon synthesis) and will accordingly need to be mechanically designed with these large differential pressures in mind.

A gas distributor with downward facing gas outlets, such as the gas distributor 14 with the downward facing gas outlets 32 defined by the diffusers 30 prevent catalyst lay-down. Advantageously, when a planar solid fluid impermeable partition 18 is employed below the gas outlets 32, the uncooled volume in the vessel 12 is minimised and equidistant spacing of the gas outlets 32 from the partition 18 is achievable in a simple manner. By ensuring that the partition 18 does not form part of the pressure envelope of the apparatus 10, the mechanical design of the partition 18 is much simplified leading to a reduction in capital costs. Advantageously, the partition 18 prevents gas jets being directed directly onto the wall of the vessel 12 thereby to inhibit erosion and the partition 18 can thus be used as a sacrificial component which is much easier to repair or replace than the wall of the vessel 12. In addition, the mechanical design of the partition 18 in the apparatus 10 is much simplified when compared to the apparatus 100 and 200, since blockages of the gas distributor 14 need not be considered.

The invention claimed is:

1. A method of operating a slurry phase apparatus, the method including feeding one or more gaseous reactants into a slurry body of solid particulate material suspended in a suspension liquid contained inside a vessel, with a head space above the slurry body, the one or more gaseous reactants being fed into the slurry body through a gas distributor having downward facing gas outlets and being fed towards a fluid impermeable partition spanning across the vessel below the gas distributor, the partition dividing the vessel into a slurry volume above the partition and a bottom volume below the partition; and    maintaining a differential pressure over the partition between predefined limits by manipulating or allowing changes in the pressure in the bottom volume by employing a pressure transfer passage establishing flow or pressure communication between the bottom volume and the head space above the slurry body.

2. The method according to claim 1, in which the partition is planar or flat and arranged perpendicular to a longitudinal vertical central axis of the vessel, thus defining a false floor or bottom for the vessel.

3. The method according to claim 1, in which the partition has a design pressure which is less than 600 kPa and in which the predefined differential pressure limits fall within the design pressure for the partition.

4. The method according to claim 1, in which the pressure in the bottom volume is allowed to change automatically in sympathy with pressure changes in the slurry volume or the head space thereby to maintain the differential pressure over the partition within said predefined limits.

* * * * *